United States Patent [19]

Damon et al.

[11] Patent Number: 4,874,074
[45] Date of Patent: Oct. 17, 1989

[54] TORSIONAL VIBRATION DAMPING MECHANISM

[75] Inventors: Gerald D. Damon, Farmington; David P. Godlew, Birmingham, both of Mich.

[73] Assignee: Eaton Corporation, Cleveland, Ohio

[21] Appl. No.: 87,587

[22] Filed: Aug. 20, 1987

[51] Int. Cl.$^4$ ............................................. F16D 3/14
[52] U.S. Cl. .............................. 192/106.2; 192/58 B; 192/106.1; 464/24; 464/68
[58] Field of Search ............... 192/58 B, 70.17, 106.1, 192/106.2; 464/24, 66, 67, 68

[56] References Cited

U.S. PATENT DOCUMENTS

| | | | |
|---|---|---|---|
| 2,284,349 | 5/1942 | Thelander | 192/106.2 |
| 4,212,380 | 7/1980 | Billet | 192/106.2 |
| 4,304,107 | 12/1981 | Fall et al. | 192/106.1 |
| 4,440,283 | 4/1984 | Nioloux | 192/106.2 |
| 4,576,259 | 3/1986 | Bopp | 192/3.21 |
| 4,601,676 | 7/1986 | Tojima | 464/24 |
| 4,726,454 | 2/1988 | Aiki | 192/106.2 |
| 4,790,792 | 12/1988 | Bopp | 192/106.2 |

FOREIGN PATENT DOCUMENTS 223442 5/1987 European Pat. Off. ......... 192/106.1

Primary Examiner—Rodney H. Bonck
Assistant Examiner—David A. Testardi
Attorney, Agent, or Firm—P. S. Rulon

[57] ABSTRACT

A torsional vibration damping mechanism (30 or 130 or 230) is disclosed in a clutch plate assembly for a vehicle driveline. In a schematically illustrated form the mechanism (30) includes a relative high rate or stiff spring set (36) for transmitting torque and alternating torsionals when a transmission input shaft (22) is connected to a load, a relatively lower or less stiff spring set (38) connected in series with spring set (36) and for attenuating torsionals when the shaft (22) is not connected to a load, and a viscous damper (44) disposed in parallel with both spring sets (36, 38) and operative to dampen recoil of both spring sets. In one detailed embodiment of the mechanism (130) the stiff spring sets (136) includes a pair of nested, spiral wound springs (135, 137). In another embodiment of the mechanism (230) the stiff spring set (236) includes helical compression springs (235, 237).

4 Claims, 4 Drawing Sheets

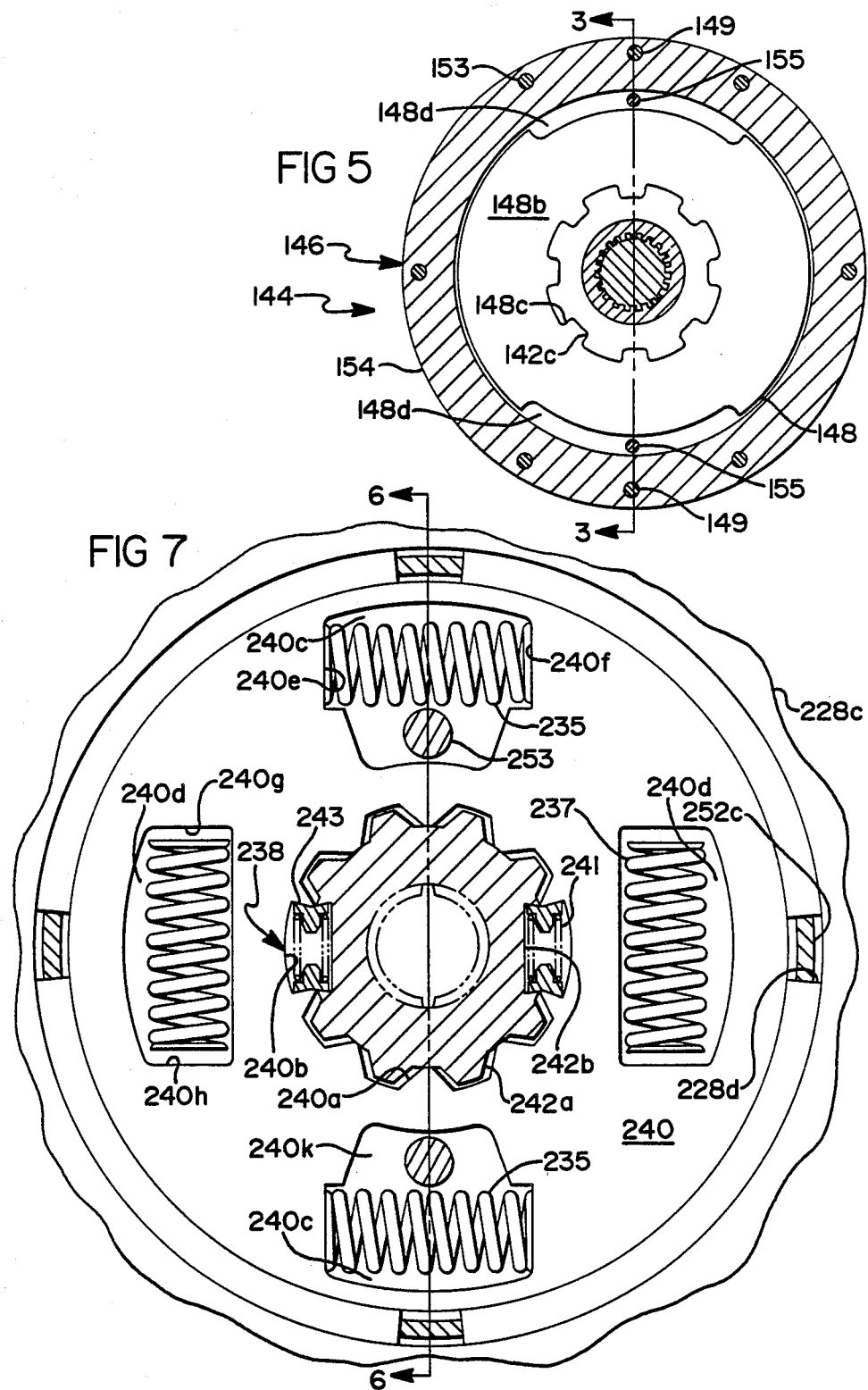

TORSIONAL VIBRATION DAMPING MECHANISM

CROSS-REFERENCE TO RELATED APPLICATIONS

The invention of this application relates to U.S. application Ser. No. 793,802, filed Nov. 1, 1985 now U.S. Pat. No. 4,782,932 and assigned to the assignee of this application.

FIELD OF THE INVENTION

This invention relates to torsional vibration damping mechanisms. More specifically, this invention relates to such mechanisms for damping torsionals in a vehicle driveline driven by a cyclic combustion engine such as a piston engine.

BACKGROUND OF THE INVENTION

Torsional vibration damping mechanisms have long been used to reduce the adverse effects of torsional vibrations or fluctuating torques in vehicle drivelines. Such torsional vibrations or fluctuating torques, herein after referred to as torsionals, emanate primarily from engine power pulses and torque spikes, and from abrupt changes in driveline torque dee primarily to rapid engine acceleration/deceleration and transmission ratio changes.

Most known, prior art torsional vibration damping mechanisms have employed springs disposed in parallel with a mechanical friction device. Driveline torque is normally transmitted by the springs and flexing of the springs attenuates or reduces the potential amplitude of the driveline torsionals. The mechanical friction device dampens or reduces the rate of spring recoil. When the amplitude of the torsionals is less than the breakaway torque of the friction device, spring flexing does not occur and the torsionals are transmitted without benefit of attenuation.

Effective damping of torsionals by known torsional vibration damping mechanisms has become increasingly more difficult due to current development trends necessitated by a need to improve vehicle efficiency. The need to improve vehicle efficiency has resulted in reductions in vehicle size and weight, reductions in inertia of driveline components such as flywheel masses, reductions in the number of engine cylinders or chambers, reductions in engine speed, increases in the number of transmission gear ratios, reductions in transmission oil viscosity, and increased use of torque converter bypass clutches.

These developments have dramatically increased long existing problems with transmission gear rattle noise, vehicle body noise, and vehicle jerk. Gear rattle is often divided into two classes i.e., idle rattle and in-gear rattle. In-gear rattle is sometimes referred to as driving mode gear rattle. Driveline torsionals provide the excitation for both types of rattle and the rattle or noise occurs when meshed gear teeth of unloaded gears bounce against each other. Body noise or body boom, as it is sometimes referred to, often occurs when an engine is lugged; under such a condition, driveline torsionals cause body components, such as sheet metal panels, to resonate. Vehicle jerk, also known as tip-in/tip-out occurs in response to abrupt engine acceleration/deceleration and ratio changes.

The above problems often have conflicting solutions. For example, idle rattle occurs when a transmission is in neutral (i.e., not connected to a load) and the transmission input shaft is connected to an engine running at or near idle speed. Under such a condition driveline torque is relatively low, and the frequencies and amplitudes of the torsionals are also relatively low. Accordingly, the torsional vibration damping mechanism must have springs of relatively low spring rate and the damper must have a relatively low breakaway torque. In-gear rattle occurs when the transmission is driving a load. Under this condition driveline torque is relatively greater and the frequencies and amplitudes of the torsionals are also relatively greater. Accordingly, the torsional vibration damping mechanism, under this condition, must have springs of relatively higher spring rate and the damper must have a relatively higher breakaway torque.

U.S. Pat. No. 4,212,380 to Billet discloses a driveline torsional vibration damping mechanism employing separate stages or assemblies for idle and in-gear conditions. Each assembly provides attenuation and damping. The assembly for idle conditions includes a set of relatively low rate springs disposed in parallel with a mechanical friction damper of relatively low breakaway torque or torque capacity. The assembly for in-gear conditions includes a set of relatively high rate springs disposed in parallel with a mechanical friction damper of relatively high breakaway torque or torque capacity. The assemblies are disposed in series and the low capacity or idle rattle assembly becomes inoperative when the transmission is driving a load.

U.S. Pat. No. 4,440,283 to Nioloux discloses a driveline torsional vibration mechanism similar to the mechanism of Billet but not having damping for the idle rattle assembly.

The Billet and Nioloux mechanisms, through improvements over prior single stage mechanisms, have added cost and complexity, and in many applications have not provided the necessary results.

SUMMARY OF THE INVENTION

An object of this invention is to provide a torsional vibration damping mechanism which effectively reduces idle rattle and in-gear rattle of a transmission.

Another objective of this invention is to provide such a mechanism which also effectively reduces vehicle body noise and vehicle jerk.

Another object of this invention is to provide such a mechanism having at least two stages of resilient means for attenuating torsions and a single damping assembly which provides the correct amount of damping for both stages of the resilient means.

Another object of this invention is to provide such a mechanism which is structurally simple and functionally effective and reliable over the full torque range of the driveline.

According to a feature of this invention, a torsional vibration damping mechanism for a driveline comprises at least first and second resilient means disposed in series and a damper assembly, the first resilient means being flexibly operative to attenuate torsionals when the driveline is connected to a load, the second resilient means being flexibly operative to attenuate torsionals when the driveline is not connected to a load and being nonflexibly operative when the driveline is connected to a load, the invention being characterized by the damper assembly being operatively connected in parallel with the first and second resilient means.

According to another feature of the invention, the damping assembly of the above mechanism includes first and second clutching means disposed for clutching coaction in response to relative rotation therebetween, and wherein the clutching coaction increases in response to increasing relative rotational velocity of the clutching means.

According to another feature of the invention, the damping assembly is a viscous shear damper.

BRIEF DESCRIPTION OF THE DRAWINGS

The torsionals vibration damping mechanism of the present invention is shown in the accompling drawings in which:

FIG. 5 is a reduced size, sectional view of another portion of the mechanism looking along line 5—5 of FIG. 3;

FIG. 7 a sectional view of a portion of the mechanism looking along line 7—7 of FIG. 6.

DETAILED DESCRIPTION OF THE DRAWINGS

Figure 1:
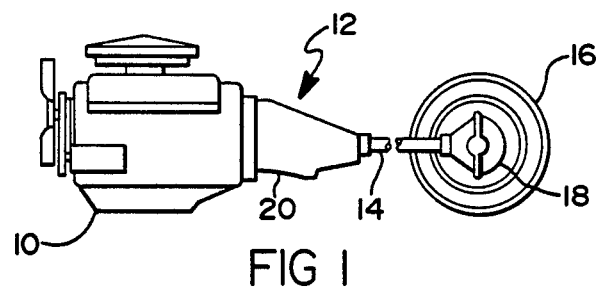
FIG. 1 is a schematic view of a motor vehicle driveline.

The motor vehicle driveline seen schematically in FIG. 1 includes a prime mover 10 and a transmission 12 having an output shaft 14 drivingly connected to a load such as a ground engaging wheel 16 via a differential gear assembly 18 for rear and/or front axles of a vehicle. Prime mover 10 is preferably of the internal, periodic combustion type but may be any type of power plant having torque characteristics that are improved by a torsional vibration damping mechanism. Transmission 12 includes a housing 20 containing a plurality of unshown, constant mesh ratio gears or ratio change mechanisms driven by a transmission input shaft on drive 22 partially shown in FIG. 2. Well-known ratio change devices or clutches within the transmission are employed to selectively (i.e., manually or automatically) put the transmission in a neutral position wherein the input shaft 22 is not connected to the load or in in-gear positions wherein the input shaft is connected to the load.

Figure 2:
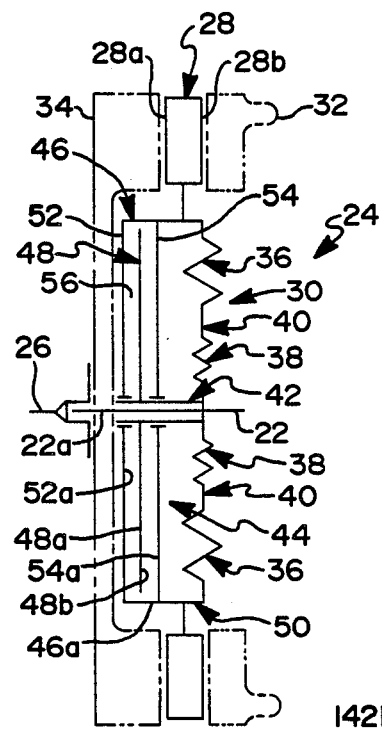
FIG. 2 is a schematic view of the torsional vibration damping mechanism of the invention.

Looking now at FIG. 2, therein is schematically illustrated in solid lines an annular clutch plate assembly 24 disposed for rotation about the axis of transmission input shaft 22. Shaft 22 may be journal supported at its left end 22a by an output shaft or drive 26 of engine 10. Clutch plate assembly 24 includes an annular friction ring 28 in driving relation with shaft 22 via a torsional vibration damping mechanism 30 positioned radially between the friction ring and shaft 22. The friction ring includes oppositely facing friction surfaces 28a, 28b frictionally connectable to engine output shaft 26 in response to selective axial movement of a pressure plate 32 toward a flywheel 34 in well known manner.

The torsional vibration damping mechanism 30 includes first and second spring stages or spring sets 36, 38, and intermediate member 40, a hub 42, and a viscous damper assembly 44. The damper assembly includes annular housing and clutch assemblies 46, 48. A support structure 50 drivingly connects friction ring 28 in parallel with spring set 36 and a radially outer portion 46a of the housing assembly 46. Intermediate member 40 connects spring sets 36, 38 in series. Spring set 38 resiliently interconnects member 40 with hub 42. Hub 42 is slidably splined to shaft 22 in known manner. Annular housing assembly 46 includes axially spaced apart sidewalls 52, 54 defining a chamber 56 filled with a viscous liquid. Radially inner portions of walls 52, 54 are journaled on hub 42. Clutch assembly 48 is slidably splined to hub 42 and includes oppositely facing surfaces 48a, 48b in close axially spaced relation with associated inner surfaces 52a, 54a of the sidewalls. The housing and clutch surfaces define clutch surfaces disposed for clutching coaction therebetween via the viscous shear liquid in response to relative rotation of the housing and clutch assemblies. Such relative rotation of course occurs in response to flexing of spring sets 36, 38. The viscous shear liquid is of high viscosity and is preferably a silicone oil; for example, dimethyl polysiloxane. The actual viscosity depends on driveline application, area and spacing of the housing and clutch surfaces, mean radius of the areas, etc.

As will be readily apparent hereinafter with respect to the torsional vibration damping mechanism embodiments of FIGS. 3-7, spring set 36 has a relatively high spring rate and provides a main spring stage flexibly operative to transmit torque and attenuate torsionals between engine output shaft 26 and transmission input shaft 22 when the shaft 22 is connected to a load. Spring set 38 has a relatively low spring rate and provides an idle rattle spring stage flexibly operative to transmit torque and attenuate torsionals between the engine output shaft 26 and transmission input shaft 22 when shaft 22 is not connected to a load. Spring set 38 is saturated or nonflexibly operative when shaft 22 is connected to a load.

Damper assembly 44 is disposed in parallel with serially disposed spring sets 36, 38. Accordingly, viscous clutching coaction between the surfaces of the housing and clutch assemblies of the damper assembly is also disposed in parallel with the serially disposed spring sets and is therefore operative to dampen or reduce the rate of recoil of both spring sets. Hence, both spring sets are damped by a single damper.

Figure 4:
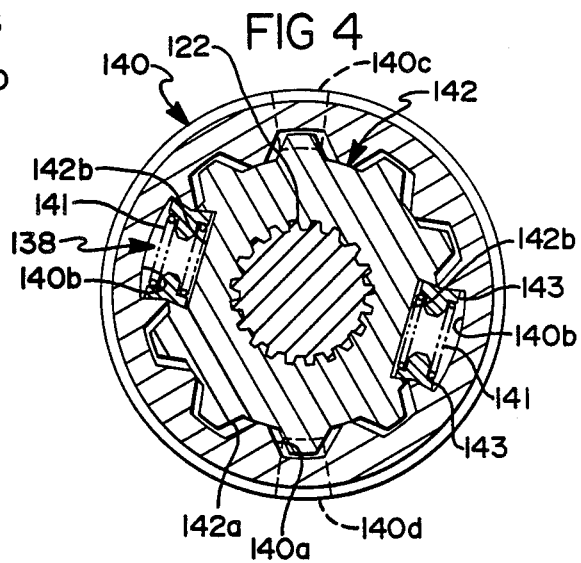
FIG. 4 is a sectional view of a central portion of the mechanism looking along line 4—4 of FIG. 3.
Figure 3:
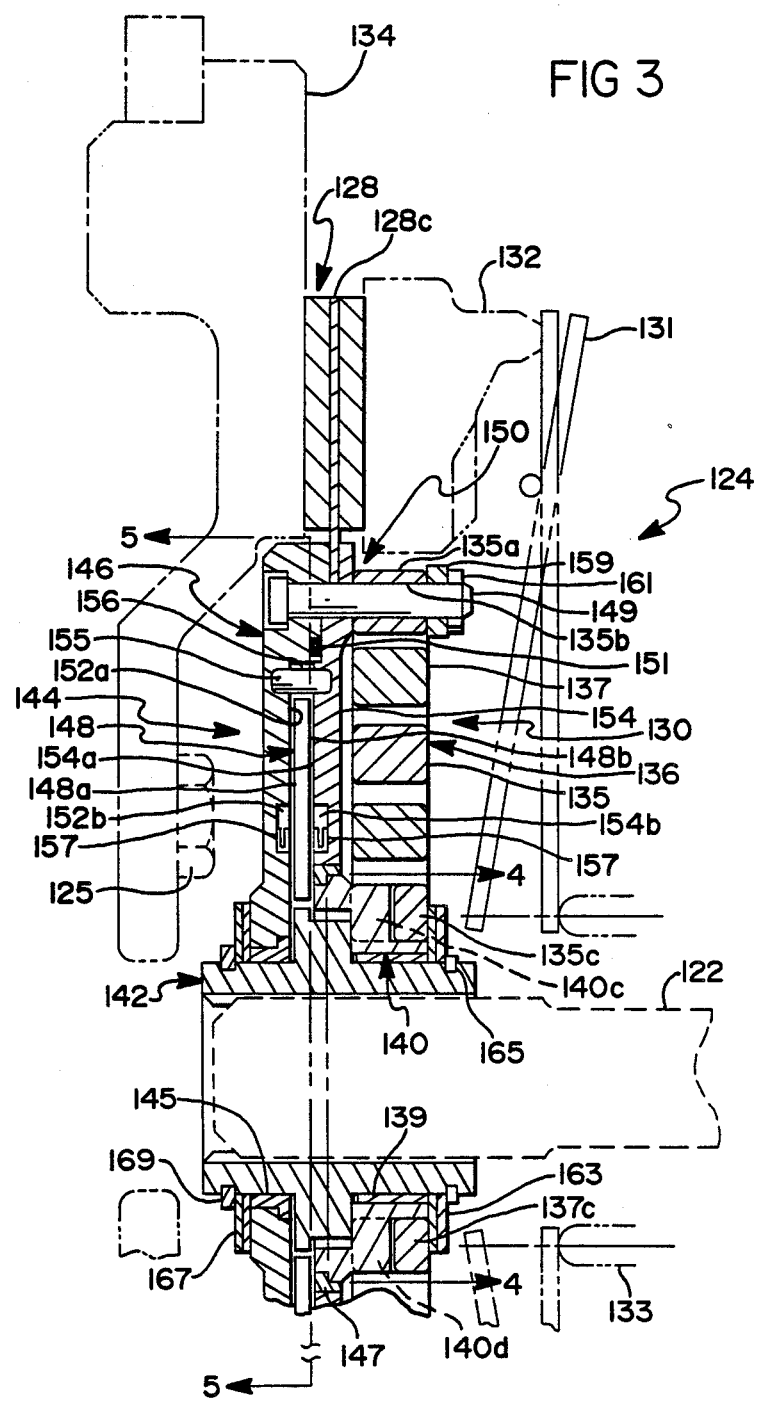
FIG. 3 is a detailed, sectional view of the torsional vibration damping mechanism looking along line 3—3 of FIG. 5 with lower half of the mechanism broken away.

Looking now at FIG. 3-5, therein elements which are functionally the same as the even numbered elements in FIGS. 1 and 2 will be identified with the same reference numerals prefixed with the number one. Accordingly, an annular clutch plate assembly 124 is disposed for rotation about the axis of a transmission input shaft 122. Clutch plate assembly 124 includes an annular friction ring 128 in driving relation with shaft 122 via a torsional vibration damping mechanism 130 positioned radially between the friction ring and shaft 122. The friction ring is clutched to a flywheel 134 by a pressure plate 132 which is axially moved leftward in known manner by a diaphragm spring 131 and a release bearing 133 schematically shown in phantom lines. The flywheel is connected to the herein unshown output shaft of the engine by a plurality of bolts 125.

The torsional vibration damping mechanism 130 includes first and second spring stages on spring sets 136, 138 an intermediate member 140, a hub 142 and a viscous damper assembly 144. The damper assembly includes annular housing and clutch assemblies 146, 148. A support structure 150, defined by a radially outer portion of housing assembly 146 and two axially extending and diametrically oppositely disposed pins bolts 149, drivingly connects friction ring 128 in parallel with spring set 136 and housing assembly 144.

Hub member 142, intermediate member 140, and spring set 138 collectively define a hub-idle rattle assembly. Member 140 is a ring or second hub and has a somewhat Z-shaped cross-section with an inner cylindrical surface journaled on an outer cylindrical surface of hub 142 via a sleeve bearing 139. The idle rattle portion of the assembly includes a plurality of internal spline teeth 140a and two diametrically oppositely disposed recesses 140b defined by second hub 140, an equal number of external spline teeth 142a loosely received in teeth 140a and two diametrically oppositely disposed recesses 142b registering with recesses 140b, and spring set 138 which includes two helical coil springs 141 and spring end members 143 positioned to react against the radial sides of recesses 140b, 142b in known manner. The idle rattle springs 141 are disposed in parallel with each other and are in turn in series with spring set 136. Deflection of springs 141 is limited to the amount of angular free play between spline teeth 140a, 142a. Springs 141 are designed to provide a force sufficient to resiliently interconnect the hubs when the transmission is in a neutral position, i.e., when shaft 122 is not connected to a load. Hence, springs 141 are of a relatively low rate or stiffness compared to spring set 136 which is designed to resiliently transmit substantially maximum driveline torque.

Housing assembly 146 includes first and second radially extending sidewalls members 152, 154 having mutually facing, axially spaced apart surfaces 152a, 154a defining a radially extending chamber 156 closed at its radially outer extent by mating portions of the sidewalls which are sealingly secured together by an annular static seal 151 and a plurality of fasteners 153 (FIG. 5). The fasteners are circumferentially spaced apart and radially disposed in the area of bolts 149. The radially outer portion of housing assembly 146 is also secured to friction ring 128 by fasteners 153 which securely sandwich a flange 128c of the friction ring between the sidewalls. The radially inner extents of sidewalls 152, 154 are respectively journaled on outer cylindrical surfaces of hubs 140, 142 by sleeve bearings 145, 147.

The clutch assembly 148 includes radially extending oppositely facing clutching surfaces 148a, 148b in close axially spaced relation with sidewall clutching surfaces 152a, 154a for viscous clutching coaction therewith via the viscous shear liquid chamber 156, a set of internal spline teeth 148c mating with external spline teeth 142a defined by hub member 142, and two circumferentially extending recesses 148d. Spline teeth 142a, 148c effect a direct driving relation between hub 142 and clutch assembly 148 and rotation of the clutch assembly relative to the housing assembly in response to flexing of spring sets 136, 138. The maximum amount of rotation between the housing and clutch assemblies is limited by stop means defined by the radial sides of the recess 148d in the outer circumference of the clutch assembly and stop pins 155 extending through each recess and anchored at their ends in axially aligned blind bores in the sidewalls 152, 154. The stop means prevent overstressing of the springs in spring set 136 and by way of example only, limit total relative rotation of about 70 degrees.

Chamber 156 is closed at its radially inner extent by annular, dynamics face seals 157 disposed in annular recesses 152b, 154b which provide the chamber with a reservoir. The face seals are biased into sealing contact with the clutch assembly surfaces 148a, 148b by unshown annular springs having a U-shaped cross section. Alternatively, rather solid ring seals may be used to provide a more rigid centering of the clutch assembly in chamber 156. Seals 157 may be obtained from the Mechanical Seal Division of the Fluorocarbon Company, P.O. Box 10871, Kayle Street, Los Alamitos, Calif. Surfaces 148a, 148b, 152a, 154a may be provided with dished or recessed portions to vary damping or viscous clutching coaction therebetween as taught in U.S. Pat. No. 4,576,259.

Spring set 136 includes a pair of nested, spiral wound springs 135, 137 resiliently disposed in parallel, structurally positioned in a plane substantially normal to the axis of shaft 122, and structurally positioned in axially spaced relation to damper assembly 144. Each spring includes a radially outer end and a radially inner end for respective attachment to pins 149 of support structure 150 and hub 140. Lower pin 149 and the radially outer end of spring 137 are not shown since the bottom portion of the clutch plate assembly is broken away in FIG. 3. The radially outer end 135a of spring 135 includes an axially extending bore 135b receiving pin 149 for pivotally mounting the spring end to support structure 150. A thrust washer 159 and a split or cotter pin 161 limit axial movement of the spring. Alternatively, spring end 135a and the corresponding end of spring 137 may be nonpivotally secured to the support structure as taught in U.S. patent application Ser. No. 058,734, filed June 5, 1987 and assigned to the assignee of this application. The inner ends 135c, 137c of springs 135, 137 are attached to hub member 140 in a manner analogous to the manner taught in U.S. patent application Ser. No. 842,566, filed Mar. 18, 1986 and assigned to the assignee of this application. Briefly, it should suffice to say that inner ends 135c, 137c each include a radially extending slot respectively receiving a lug 140c, 140d extending radially outward from hub 140. Hub 140 further includes unshown scroll surfaces which mate with the scroll shaped surfaces of the spiral wound springs. The scroll surfaces provide a seating surface for reducing transverse stress in the springs as they wind up during torque transfer to the hub from the springs. The lugs 140c, 140d and the spring slots, preferably, have radially outwardly diverging sides to prevent radial disengagement therebetween. Rightward axial movement of the spring ends relative to hub 140 and hub 140 relative to hub 142 is prevented by thrust washers 163 and a retaining ring 165. In a like manner, leftward axial movement of damper housing assembly 146 is relative to hub 142 is prevented by thrust washers 167 and a retaining ring 169.

Operation of torsional vibration damping mechanism 130, of FIGS. 3–5 is as previously described for mechanism 30 of FIG. 2.

Figure 6:
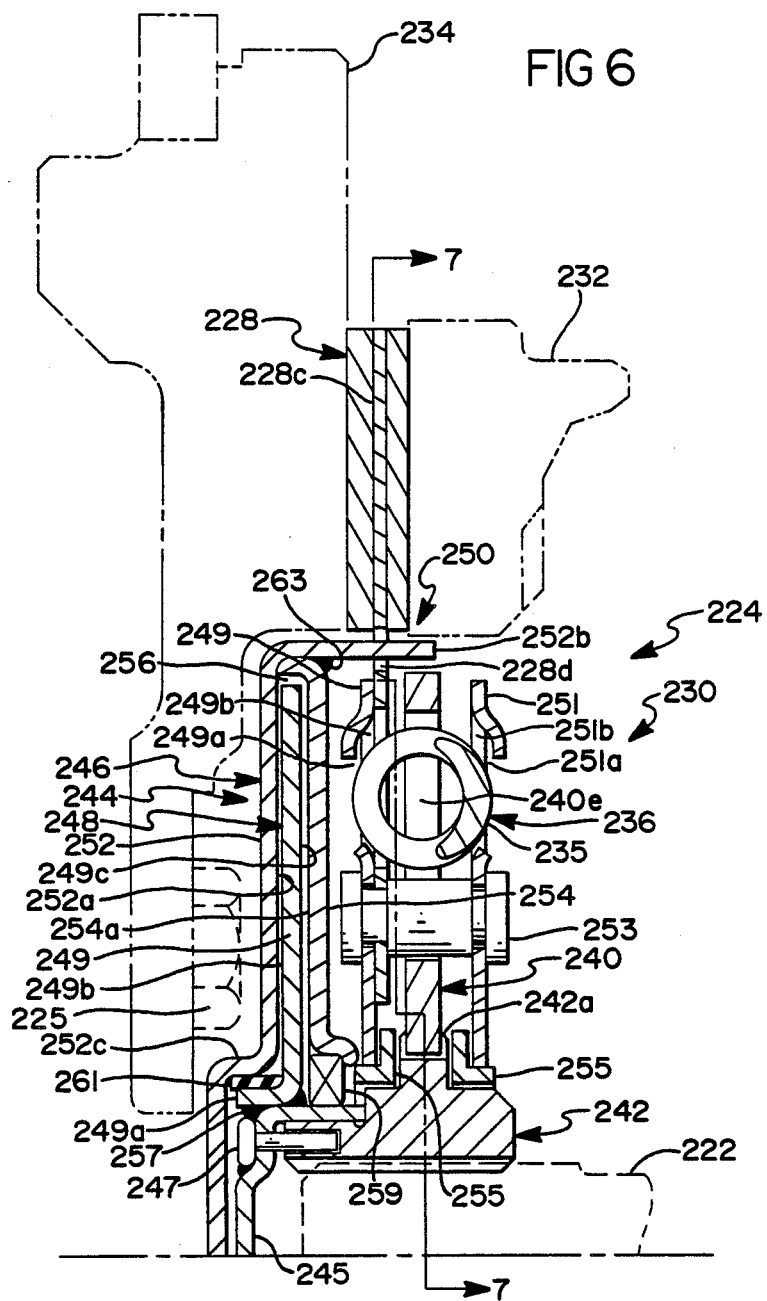
FIG. 6 is a detailed, sectional view of the upper half of another embodiment of the torsional vibration damping mechanism looking along line 6—6 of FIG. 7.

Looking now at FIGS. 6 and 7, elements therein, which are functionally the same as elements in FIGS. 1 and 2, will be identified with the same reference numerals prefixed with the number two. Accordingly, an annular clutch plate assembly 224 is disposed for rotation about the axis of a transmission input shaft 222. Clutch plate assembly 224 includes an annular friction ring 228 in driving relation with shaft 222 via a torsional vibration damping mechanism 230 positioned radially between the friction ring and shaft 222. The friction ring is clutched to a flywheel 234 by a pressure plate 232 moved axially in an manner analogous to that of FIG. 3. The flywheel is connected to the herein unshown output shaft of the engine by a plurality of bolts 225.

The torsional vibration damping mechanism 230 includes first and second spring stages or spring sets 236, 238, an intermediate member 240, a hub 242, and a viscous damper assembly 244. Spring set 236 includes two pair of relatively high rate or stiff, helical compression springs 235, 237. Spring set 238 includes two relatively low rate or low stiffness, helical compression springs 241. The damper assembly includes annular housing and clutch assemblies 246, 248 which are formed by stamping and therefore are relatively inexpensive to manufacture since they require little or no machining. A support structure 250 includes axially spaced apart, radially extending annular plates or walls 249, 251 rigidly secured together by two axially extending pins 253 which also secures a flange 228c of friction ring 228 to the support structure. The helically wound compression springs 235, 237 of spring set 236 are circumferentially spaced apart and disposed in axially aligned pairs of opening or windows 249a, 251a which each include circumferentially spaced apart ends or reaction surfaces 249b, 251b a butting relation with the associated spring. The inner peripheries of walls 249, 251 are journaled on hub 242 by sleeve type bearing 253.

Intermediate member 240 is an annular radially extending member disposed between plates or walls 249, 251. Member 240, hub 242, and spring set 238 define an idle rattle assembly substantially the same as the idle rattle assembly in FIG. 4 and accordingly requires no further comment other than the assembly includes internal spline teeth 240a, spring recesses 240b, external spline teeth 242a loosely received by teeth 240a, spring recesses 242b, the low rate helical compression springs 241, and spring end members 243. Member 240 also includes pairs of circumferentially spaced apart openings 240c, 240d each receiving one of the springs 235 or 237 and respectively having circumferentially spaced apart ends or reaction surfaces 240e, 240f and 240g, 240h disposed in abutting relation with the associated spring ends. A portion 240k of openings 240c extends radially inward to allow relative rotation between member 240 and the support structure (i.e., walls 249, 251).

In the disclosed embodiment, reaction surfaces 240g, 240h of openings 240d are circumferentially spaced from their associated spring ends so as to provide mechanism 230 with an apparent spring rate that increases after a predetermined amount of relative rotation between walls 249, 251 and member 240. The actual spring rate of the springs in each pair is preferably the same but may vary from pair-to- pair.

With respect to damper assembly 244, housing assembly 246 includes first and second radially extending sidewalls members 252, 254 having mutually facing surfaces 252a, 254a defining a radially extending chamber 256 closed at its radially outer extent by an weld 251 which also secures the sidewalls together. The housing is secured to support structure 250 by a plurality of axially extending tangs 252b received by opening 228d of friction ring flange 228c. Sidewall member 252 includes an annular dished central portion defining a cylindrical portion 252c.

Clutch assembly 248 includes a central cup-shaped member 245 secured to hub 242 by a plurality of fasteners 247, and an annular clutch member 249 having an axially extending portion 249a secured to member 245 by a weld 257 and an annular radially extending portion having oppositely facing clutching surfaces 249b, 249c in close axially spaced relation with sidewall clutching surfaces 252a, 254a for viscous clutching coaction therewith. An outer cylindrical surface of cup-shaped member 245 provides a running surface for a dynamic seal 259 pressed at its outer periphery into a cylindrical opening defined by the radially inner extent of sidewall 254. A sleeve bearing 261 disposed between cylindrical portions 249a and 252c journals housing wall 252 on clutch assembly 248 which is in-turn supported by hub 242. As may be seen the central structure of housing and clutch assemblies is such that chamber 256 is sealed against leakage by one dynamic seal 259.

The torsional vibration damping mechanism 230 of FIGS. 6 and 7 operates as previously described for mechanism 30 of FIG. 2 and mechanism 130 of FIGS. 3-5. The spiral wound springs 135, 137 of FIGS. 3-5 in general allow greater amounts of relative solution between components of mechanism 130 than do the helical compression springs 235, 237 of mechanism 230.

Two detailed structural embodiments of the present invention have been disclosed herein for illustration purposes only. The appended claims are intended to cover the inventive features of the disclosed embodiments and modifications of the inventive features believed to be within the spirit of the invention.

What is claimed is:

1. A torsional vibration damping mechanism adapted to be rotationally interposed in a driveline between an output drive of a prime mover and an input drive of a transmission having in-gear and neutral positions respectively connecting and disconnecting the input drive with a load; the mechanism comprising:

first and second assemblies disposed for relative rotation about a common axis, the first assembly including fist and second radially extending, axially spaced apart wall members secured together and adapted for selective driving connection to the prime mover drive via a friction ring, the second assembly being an annular hub member adapted to be sidably splined to the transmission input drive, and the wall members each including an inner peripheral portion journaled on the hub member;

an intermediate means including a radially extending member disposed between the first and second wall members and radially outward of the hub member, the member of the intermediate means including a plurality of internal spline teeth mating with a plurality of external spline teeth on the hub member, the mating teeth having a predetermined amount of circumferential free play therebetween;

a first spring set comprising a plurality helical compression springs of relatively high spring rate circumferentially spaced apart and resiliently interconnecting the wall members with the intermediate means member;

a second spring set comprising at least one idle rattle spring having a relatively low spring rate and resiliently disposed between the intermediate means member and the hub member for resiliently opposing the free play between the spline teeth; and a viscous shear damper assembly including housing and clutch assemblies mounted for relative rotation and respectively connected to the first assembly and the hub member of the second assembly, the clutch assembly disposed in a chamber defined by the housing assembly and being in viscous shear clutching coaction in response to flexing of either of the spring sets.

2. The mechanism of claim 1, wherein the housing assembly includes a sidewall having an inner peripheral portion journaled on the clutch assembly.

3. A torsional vibration damping mechanism adapted to be rotationally interposed in a driveline between an output drive of a prime mover and an input drive of a transmission having in-gear and neutral positions respectively connecting and disconnecting the input drive with a load; the mechanism comprising:

first and second assemblies disposed for relative rotation about a common axis and adapted to drivingly interconnect the drives;

An intermediate means disposed between the assemblies;

first resilient means including a plurality of helical compression springs disposed in parallel and interposed between the first assembly and the intermediate means;

second resilient means interposed between the intermediate means and the second assembly, the intermediate means connecting the first and second resilient means in series between the assemblies the first resilient means having a relatively high spring rate for flexible operation during the transmission in-gear positions, the second resilient means having a relatively low spring rate for flexible operation substantially only during the transmission neutral positions, and the second resilient means being saturated and nonflexible during the transmission in-gear positions;

a damper assembly including first and second clutching means disposed for clutching coaction in response to relative rotation therebetween, the first clutching means being in fixed driving relation with the first assembly; the improvement comprising;

means for effecting a fixed driving connection between the second clutching means and second assembly, whereby the clutching coaction is in parallel with the first and second resilient means; and the damper assembly comprises a viscous shear damper including an annular housing assembly having a radially outer portion fixed to the first assembly and having first and second spaced apart walls defining a chamber containing a viscous shear liquid, at least one of said walls having an interior surface defining a first clutching surface of said clutching means; and an annular clutch assembly having a radially inner portion fixed to the second assembly and having a radially outer portion disposed in said chamber, said radially outer portion having a surface spaced from said first clutching surface and defining a second clutching surface of said second clutching means, and said first and second clutching surfaces being in clutching coaction via said viscous shear liquid.

4. A torsional vibration damping mechanism adapted to be rotationally interposed in a driveline between an output drive of a prime mover and an input drive of a transmission having in-gear and neutral positions respectively connecting and disconnecting the input drive with a load; the mechanism comprising:

first and second assemblies disposed for relative rotation about a common axis and adapted to drivingly interconnect the drives;

an intermediate means disposed between the assemblies;

first resilient means interposed between the first assembly and the intermediate means;

second resilient means interposed between the intermediate means and the second assembly, the intermediate means connecting the first and second resilient means in series between the assemblies, on of the resilient means having a relatively high spring rate for flexible operation during the transmission in-gear positions, the other resilient means having a relatively low spring rate for flexible operation substantially only during the transmission neutral positions, and the other resilient means being saturated and nonflexible during the transmission in-gear position;

a damper assembly including first and second clutching means disposed for clutching coaction in response to relative rotation therebetween, the first clutching means being in fixed driving relation with the first assembly; the improvement comprising;

means for effecting a fixed driving connection between the second clutching means and second assembly, whereby the clutching coaction is in parallel with the first and second resilient means;

a friction assembly supported on an annular flange fixed to and disposed radially outward of the first assembly and adapted to be frictionally clamped between pressure plates of an engagement mechanism driven by the output drive;

said first resilient means including a plurality compression springs;

said first assembly including a pair of axially spaced apart, annular, radially extending side walls fixed together, each side wall including a plurality circumferentially spaced apart reaction surfaces, said reaction surfaces being axially aligned in pairs to define pockets, said pockets each embracing at least one of said compression springs with the ends of the springs in abutting relation with the reaction surfaces;

said intermediate means including an annular radially extending member disposed between the side walls, said member having a plurality of circumferentially spaced apart openings each receiving at least one of the compression springs and each having circumferentially spaced apart reaction surfaces in abutting relation with the spring ends;

said second assembly including an annular hub adapted to be slidably splined to the input drive, said hub having outer cylindrical surfaces journaling radially inner portions of the side walls thereon;

said second resilient means being disposed between the hub and a radially inner portion of said member for effecting a low spring rate driving connection therebetween;

said damping assembly including annular housing and clutch assemblies axially adjacent said first assembly, said housing assembly having a radially outer portion fixed to said first assembly and having first and second axially spaced apart sidewalls defining a chamber containing a viscous shear liquid, at least one of said sidewalls having an interior surface defining a first clutching surface of said clutching means, at least one of said sidewalls having a radially inner cylindrical surface journaled on an outer cylindrical surface of said hub, said clutch assembly having a radially inner portion fixed to the hub and having a radially outer portion disposed in said chamber, said radially outer portion having a surface spaced axially from said first clutching surface and defining a second clutching surface of said second clutching means, and said first and second clutching surfaces being in clutching coaction via said viscous shear liquid.

* * * * *